(12) United States Patent
Sawaf et al.

(10) Patent No.: US 11,886,794 B2
(45) Date of Patent: Jan. 30, 2024

(54) TEXT SCRAMBLING/DESCRAMBLING

(71) Applicant: Saudi Arabian Oil Company, Dhahran (SA)

(72) Inventors: Khaled Sawaf, New York, NY (US); Sheikah Alshaihah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/490,396

(22) Filed: Sep. 30, 2021

(65) Prior Publication Data

US 2022/0129618 A1   Apr. 28, 2022

Related U.S. Application Data

(60) Provisional application No. 63/105,016, filed on Oct. 23, 2020.

(51) Int. Cl.
*G06F 40/109* (2020.01)
*G06F 40/166* (2020.01)
(Continued)

(52) U.S. Cl.
CPC ........ *G06F 40/109* (2020.01); *G06F 21/6254* (2013.01); *G06F 40/106* (2020.01);
(Continued)

(58) Field of Classification Search
CPC .... G06F 40/109; G06F 40/106; G06F 40/166; G06F 21/6254
See application file for complete search history.

(56) References Cited

U.S. PATENT DOCUMENTS

| 4,603,330 A | 7/1986 | Horne |
| 5,182,709 A | 1/1993 | Makus |

(Continued)

FOREIGN PATENT DOCUMENTS

| CN | 101978348 A | * | 2/2011 | ............ G06F 16/113 |
| EP | 1515215 B1 | * | 1/2007 | ....... G06F 17/30864 |

(Continued)

OTHER PUBLICATIONS

PCT International Search Report and Written Opinion in International Appln. No. PCT/IB2021/000709, dated Jan. 21, 2022, 14 pages.

(Continued)

*Primary Examiner* — Benjamin Smith
(74) *Attorney, Agent, or Firm* — Fish & Richardson P.C.

(57) ABSTRACT

Disclosed are methods, systems, and computer-readable medium to perform operations including: generating a font that includes a plurality of glyphs for characters of a language; generating a plurality of duplicate glyphs for the characters, wherein each duplicate glyph is associated with: (i) a respective letterform representing one of the characters, and (ii) a respective glyph code; swapping the respective letterforms of the plurality of duplicate glyphs such that the respective letterforms are mismatched with the respective glyph codes; designating the plurality of duplicate glyphs as a scrambling font style of the font; and providing a representation of the font for output on a graphical user interface (GUI) displayed on a display device.

16 Claims, 8 Drawing Sheets

(51) Int. Cl.
*G06F 40/106* (2020.01)
*G06T 11/20* (2006.01)
*G06F 21/62* (2013.01)

(52) U.S. Cl.
CPC .......... *G06F 40/166* (2020.01); *G06T 11/203* (2013.01); *H04L 2209/42* (2013.01)

(56) References Cited

U.S. PATENT DOCUMENTS

| | | | |
|---|---|---|---|
| 5,416,898 A | 5/1995 | Opstad | |
| 6,631,482 B1* | 10/2003 | Marks | G06F 21/6245 |
| | | | 714/38.14 |
| 6,882,441 B1* | 4/2005 | Faust | G06F 40/186 |
| | | | 358/1.18 |
| 7,805,673 B2* | 9/2010 | der Quaeler | G06F 16/33 |
| | | | 715/255 |
| 7,991,153 B1 | 8/2011 | Rao et al. | |
| 8,429,397 B2* | 4/2013 | Imai | G06F 21/608 |
| | | | 713/150 |
| 8,543,382 B2 | 9/2013 | Khorsheed | |
| 8,584,005 B1* | 11/2013 | Pittenger | G06F 40/166 |
| | | | 715/233 |
| 8,707,164 B2* | 4/2014 | Adler, III | G06F 40/109 |
| | | | 715/239 |
| 8,839,448 B2* | 9/2014 | White | H04L 61/3015 |
| | | | 705/51 |
| 8,902,170 B2 | 12/2014 | Pasquero et al. | |
| 9,237,136 B2* | 1/2016 | Kurosawa | G06F 21/6209 |
| 9,298,277 B1 | 3/2016 | Alsabah | |
| 9,369,468 B2* | 6/2016 | White | H04L 63/10 |
| 9,477,836 B1* | 10/2016 | Ramam | H04W 12/02 |
| 9,529,449 B1 | 12/2016 | Chen | |
| 9,619,435 B2 | 4/2017 | Wendt | |
| 9,680,836 B2* | 6/2017 | White | H04L 63/0428 |
| 9,836,623 B2* | 12/2017 | Carasso | G06F 16/2322 |
| 9,846,684 B2 | 12/2017 | Beaver et al. | |
| 10,019,415 B1 | 7/2018 | Wombell | |
| 10,234,958 B2 | 3/2019 | Chen | |
| 10,242,204 B2* | 3/2019 | Sathish | H04W 12/08 |
| 10,284,527 B2* | 5/2019 | Garcia | H04L 63/0428 |
| 10,297,233 B2* | 5/2019 | Carey | G06V 40/166 |
| 10,402,471 B2* | 9/2019 | Le Henaff | G06F 40/109 |
| 10,592,694 B2* | 3/2020 | Carasso | G06F 21/6254 |
| 10,878,186 B1* | 12/2020 | Liu | G06V 30/418 |
| 10,936,791 B2* | 3/2021 | Le Henaff | G06T 11/203 |
| 11,062,080 B2* | 7/2021 | Kumawat | G06F 21/602 |
| 11,170,129 B1* | 11/2021 | Carasso | G06F 3/04847 |
| 11,356,474 B2* | 6/2022 | Levin | H04L 63/1466 |
| 11,403,456 B2* | 8/2022 | Kumawat | G06F 40/109 |
| 11,438,346 B2* | 9/2022 | Levin | H04L 41/5054 |
| 2004/0257301 A1 | 12/2004 | Ari | |
| 2007/0030528 A1* | 2/2007 | Quaeler | G06F 16/33 |
| | | | 358/448 |
| 2007/0262991 A1 | 11/2007 | Abulhab | |
| 2008/0030502 A1 | 2/2008 | Chapman | |
| 2008/0276166 A1 | 11/2008 | Wang-Aryattanwanich | |
| 2008/0300861 A1 | 12/2008 | Emam | |
| 2008/0301431 A1* | 12/2008 | Hea | G09C 1/02 |
| | | | 380/255 |
| 2009/0182728 A1* | 7/2009 | Anderson | G06F 16/113 |
| | | | 707/999.005 |
| 2009/0300481 A1* | 12/2009 | Imai | G06F 21/608 |
| | | | 358/1.11 |
| 2011/0258535 A1* | 10/2011 | Adler, III | G06F 40/151 |
| | | | 715/235 |
| 2012/0042236 A1* | 2/2012 | Adler, III | G06F 40/151 |
| | | | 715/234 |
| 2012/0109633 A1 | 5/2012 | Khorsheed | |
| 2012/0110436 A1* | 5/2012 | Adler, III | G06F 40/109 |
| | | | 715/234 |
| 2012/0115112 A1* | 5/2012 | Purushotma | G09B 5/06 |
| | | | 434/157 |
| 2013/0097713 A1* | 4/2013 | White | G06F 21/6209 |
| | | | 726/26 |
| 2014/0115452 A1 | 4/2014 | Rudolph | |
| 2014/0237241 A1* | 8/2014 | Kurosawa | G06F 21/602 |
| | | | 713/168 |
| 2014/0351955 A1* | 11/2014 | White | H04L 63/0428 |
| | | | 726/27 |
| 2014/0380169 A1 | 12/2014 | Eldawy | |
| 2016/0092409 A1* | 3/2016 | Le Henaff | G06F 40/106 |
| | | | 715/269 |
| 2016/0224804 A1* | 8/2016 | Carasso | G06F 16/2322 |
| 2016/0226836 A1* | 8/2016 | Garcia | H04L 63/061 |
| 2016/0255084 A1* | 9/2016 | White | H04L 61/3005 |
| | | | 726/27 |
| 2017/0010860 A1 | 1/2017 | Henniger | |
| 2017/0017854 A1 | 1/2017 | You | |
| 2017/0046523 A1* | 2/2017 | Sathish | G06F 21/604 |
| 2017/0102780 A1 | 4/2017 | Chen | |
| 2017/0301115 A1* | 10/2017 | Le Henaff | G06T 11/203 |
| 2018/0046829 A1* | 2/2018 | Carasso | G06F 3/0484 |
| 2018/0247611 A1* | 8/2018 | Carey | G09G 5/30 |
| 2020/0074109 A1* | 3/2020 | Pieniazek | H04L 9/00 |
| 2020/0137089 A1* | 4/2020 | Levin | H04L 63/10 |
| 2020/0226231 A1* | 7/2020 | Kumar | H04L 63/0428 |
| 2021/0073322 A1* | 3/2021 | Kumawat | G06F 40/109 |
| 2021/0168168 A1* | 6/2021 | Levin | H04L 63/1425 |
| 2021/0271800 A1* | 9/2021 | Kumawat | G06F 40/109 |

FOREIGN PATENT DOCUMENTS

| | | | | |
|---|---|---|---|---|
| JP | 2020098616 A | * | 6/2020 | .......... G06F 17/273 |
| WO | WO-0141018 A2 | * | 6/2001 | .......... G06Q 30/06 |

OTHER PUBLICATIONS

"DCODE: Diacritics Obfuscation," retrieved from URL <https://www.dcode.fr/diacritics-obfuscation>, 2020, 2 pages.

Baawi et al., "Improvement of Text Steganography Based on Unicode of Characters in Multilingual by Custom Font with Special Properties," IOP Conf. Series: Materials Science and Engineering 2020, 870:012125, 11 pages.

Blatner, "Scramble Text in Place to Hide Private Info," retrieved from URL <http://indesignsecrets.com/scramble-text-place-hide-private-info.php>, Nov. 11, 2014, 8 pages.

designwithfontforge.com [online], "Design With FontForge: A Book About How to Create New Typefaces Using FontForge," Sep. 28, 2020, retrieved from URL < http://designwithfontforge.conn/en-US/Diacritics and Accents.html>, available via internet archive URL <https://web.archive.org/web/20200628033344/http://designwithfontforge.conn/en-US/Diacritics and Accents.html>, 2020, 9 pages.

Gutub et al., "Utilizing Diacritic Marks for Arabic Text Steganography," Kuwait Journal of Science & Engineering 2020, 37:1 (89-109), 11 pages.

Maannouri et al., "Developing ARET: an NLP-based educational tool set for Arabic reading enhancement," the 7th Workshop on the Innovative Use of NLP for Building Education Applications, Jun. 3-8, 2012, 127-135, 9 pages.

robofont.com [online], "Documentation: Introduction to accented glyphs," available on or before Feb. 6, 2020, retrieved from URL <https://robofont.conn/docunnentation/how-tos/introduction-to-accented-glyphs/>, available from internet archive, <https://web.archive.org/web/20200921183156/https://robofont.conn/docunnentation/how-tos/introduction-to-accented-glyphs/>, 2020, 3 pages.

textmechanic.com [online], "Word Scrambler/Descrambler," retrieved from URL <http://textmechanic.com/text-tools/obfuscation-tools/word-scramblerunscrambler/>, retrieved on Sep. 21, 2020, available on or before 2015, 2 pages.

w3.org [online], "G163: Using standard diacritical marks that can be turned off," available on or before Jul. 20, 2017, retrieved from URL <https://www.w3.org/TR/2008/NOTE-WCAG20-TECHS-20081211/G163>, available from internet archive URL <https://web.archive.

(56) References Cited

OTHER PUBLICATIONS org/web/20170720050654/https://www.w3.org/TR/2008/NOTE-WCAG20-TECHS-20081211/G163>, 2017, 2 pages.

* cited by examiner

TEXT SCRAMBLING/DESCRAMBLING

CLAIM OF PRIORITY

This application claims priority to U.S. Provisional Patent Application No. 63/105,016 filed Oct. 23, 2020, entitled "TEXT SCRAMBLING/DESCRAMBLING," the entirety of which is incorporated herein by reference.

TECHNICAL FIELD

This disclosure relates to methods and systems for scrambling/descrambling text, for example, text that is displayed on a graphical user interface.

BACKGROUND

Document security tools are used to secure documents that include sensitive content. Such tools include password protection, encryption, digital rights management, watermarking, and document tracking. These tools are used to secure electronic documents, physical documents, or both.

SUMMARY

During a document preparation workflow, a document may be accessed for purposes unrelated to the content of the document. For example, a document may be accessed for design purposes. However, if the document is secured by a document security tool, collaboration, development, and approval of the design workflows can become complicated. For example, the security tool may make it difficult to easily share the design and layout between collaborators working on the design. Additionally, print tests cannot be performed without pre-planned security protocols. Further, even if the document itself is secure, any user who can access the document for design purposes will also be able to read the content. But such users may be unauthorized to view the content. Existing security tools do not distinguish between users that can access the document and its content and users that can access the document but not the content.

This disclosure describes methods and systems that enable access to secure documents without revealing their content. In one embodiment, a scrambling font style is generated for a font. The scrambling font style can be used to scramble the content of a document while preserving the design appearance of the document. More specifically, selecting the scrambling font style for a text rearranges the words and numbers of the text to respectively appear as meaningless words and zeros. However, the font style maintains the letter cases, punctuation marks, and font appearance. Additionally, the font style maintains the length, formatting, spacing, and placement of the text. Maintaining these design settings and formatting keeps the overall design appearance of the documents intact. Once the text is scrambled, the document can be shared with users that are not authorized to view the content. For example, printouts of the document can be shared with such users. The scrambled document is useful for any purpose other than reading its content. Once the document is shared, the content can be descrambled by selecting a different font style for the text. The original content is restored without any loss or alteration.

In one aspect, the subject matter described in this specification may be embodied in methods that include the actions of: generating a font that includes a plurality of glyphs for characters of a language; generating a plurality of duplicate glyphs for the characters, wherein each duplicate glyph is associated with: (i) a respective letterform representing one of the characters, and (ii) a respective glyph code; swapping the respective letterforms of the plurality of duplicate glyphs such that the respective letterforms are mismatched with the respective glyph codes; designating the plurality of duplicate glyphs as a scrambling font style of the font; and providing a representation of the font for output on a graphical user interface (GUI) displayed on a display device.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the methods further involve generating at least one font weight style for the font; and providing the at least one font weight style for output on the GUI.

In some implementations, the GUI includes a font menu that includes a representation of the scrambling font style.

In some implementations, the methods further involve receiving a user input indicating selection of the scrambling font style for a text displayed on the GUI.

In some implementations, the methods further involve in response to receiving the user input, applying the scrambling font style to the text, where the text is scrambled after the scrambling font style is applied to the text.

In some implementations, a subset of the plurality of duplicate glyphs are associated with numerals, and swapping the respective letterforms of the plurality of duplicate glyphs involves swapping the respective letterforms of the subset with a letterform of the numeral zero.

In some implementations, swapping the respective letterforms of the plurality of duplicate glyphs is based on at least one of: case of the respective letterforms, positional context of the respective letterforms, kerning of the respective letterforms, or side-bearings of the respective letterforms.

In another aspect, the subject matter described in this specification may be embodied in methods that include the actions of: providing a representation of a scrambling font feature for output on a graphical user interface (GUI) displayed on a display device; receiving a user input indicating selection of the scrambling font feature for a text displayed on the GUI; and in response to receiving the user input, changing a stylistic configuration of the text, where the text is scrambled after the stylistic configuration of the text is changed.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the scrambling font feature is a scrambling font style, and the stylistic configuration of the text is a font style of the text.

In some implementations, the scrambling font feature is a scrambling stylistic set, and the stylistic configuration of the text is a stylistic set of a font of the text.

In some implementations, the user input is a first user input, and the methods further involves: receiving a second user input indicating deselection of the scrambling font feature for the text displayed on the GUI; and in response to receiving the second user input, changing the stylistic configuration of the text, where the text is descrambled after the stylistic configuration of the text is changed.

In some implementations, the scrambling font feature includes a plurality of glyphs, and the letterforms of the plurality of glyphs are mismatched with glyph codes of the plurality of glyphs.

In some implementations, the letterforms of the plurality of glyphs are swapped based on at least one of: case of the respective letterforms, positional context of the respective letterforms, kerning of the respective letterforms, or side-bearings of the respective letterforms.

The subject matter described in this specification can be implemented to realize one or more of the following advantages. The disclosed systems enable an instantaneous security classification change for documents. Specifically, the disclosed systems allow toggle-switching between a classified status and a declassified status. As such, the disclosed systems avoid costly document security requirements and delays associated with such requirements. Further, unlike existing document security tools, the disclosed systems quickly and efficiently scramble secure content while maintaining the design of the content, which allows users that are not authorized to view the content to access the document. Additionally, the disclosed systems can produce secure document printouts without document security tools.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes methods and systems that enable access to secure documents without revealing their content. In an embodiment, a font system generates a scrambling font style. The font system provides the scrambling font style for output on a graphical user interface (GUI), for example, of a document editing software. The scrambling font style can be used to scramble the content of a secure document while preserving the document's design. Selecting the scrambling font style for a text rearranges the words and numbers of the text to appear as meaningless words and zeros. The font style maintains the letter cases, punctuation marks, and font appearance. The font style also maintains the length, formatting, spacing, and placement of the text. Maintaining these design settings and formatting keeps the overall design appearance of the documents intact. The scrambled text can be descrambled by selecting a different font weight style for the text. The original content is restored without any loss or alteration.

Figure 1:
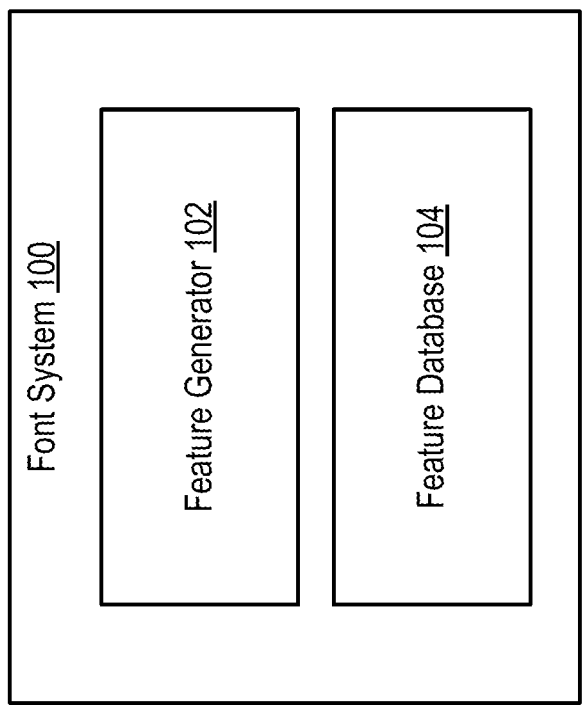
FIG. 1 illustrates a block diagram of an example font system, according to some implementations of the present disclosure.

FIG. 1 illustrates an example block diagram of a font system 100, according to some implementations. The font system 100 enables single-input toggling between a scrambled and a descrambled text. In some embodiments, the font system 100 is implemented by a computing system, such as the computer system 600 of FIG. 6. Note that the font system 100 is shown for illustration purposes only, as the font system 100 may include additional components or have one or more components removed without departing from the scope of the disclosure. Further, note that the various components of the font system 100 may be arranged and connected in any manner.

As shown in FIG. 1, the font system 100 includes a feature generator 102 and a feature database 104. The feature generator 102 is configured to generate one or more features that are used to scramble/descramble text. The feature generator 102 stores the one or more features in the feature database 104. In one example, the feature generator 102 generates a scrambling font style for a font. In another example, the feature generator 102 generates a scrambling stylistic set for a font. The font system 100 can provide the one or more features for output on user interfaces. Selecting the scrambling font style or the scrambling stylistic set for a text scrambles the text. Selecting another font style or stylistic set for the scrambled text descrambles the text.

Figure 2:
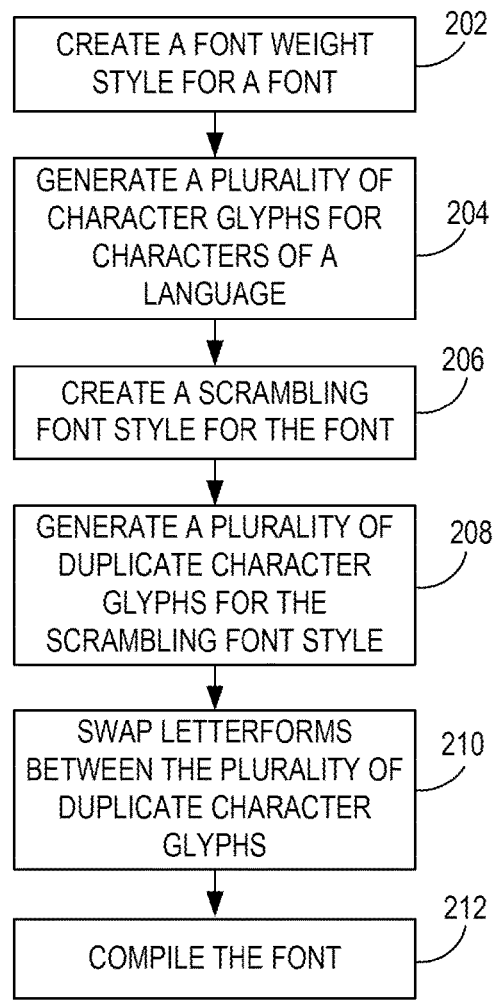
FIG. 2 illustrates an example workflow for generating a scrambling font style, according to some implementations of the present disclosure.

FIG. 2 illustrates an example workflow 200 for generating a scrambling font style, according to some implementations. For clarity of presentation, the description that follows generally describes workflow 200 in the context of components in other figures of this description. For example, workflow 200 can be performed by the feature generator 102, which can be implemented using computer system 600 of FIG. 6. However, it will be understood that workflow 200 can be performed, for example, by any suitable system, environment, software, hardware, or a combination of systems, environments, software, and hardware, as appropriate. In some implementations, various steps of the workflow 200 can run in parallel, in combination, in loops, or in any order.

At step 202, workflow 200 involves creating a font weight style for a font. Font weight style refers to a thickness or thinness of a typeface of the font. Example font weight styles include a bold (heavyweight) font, a normal font, and a light (lightweight) font. The font weight style can be created using a font generation software, which generates a source file for the font weight style. In some examples, more than one font weight style is generated for the font.

At step 204, workflow 200 involves generating a plurality of character glyphs for characters of a language. The characters can include letters, numbers, punctuation marks, and diacritic marks. Each character glyph is associated with a letterform that represents one of the characters of the language. Additionally, each character glyph is associated with a glyph code that is used by computing systems to identify the glyph. For example, the glyph code may be Unicode, which is a standard encoding format for glyphs. In one example, the plurality of character glyphs are generated by a font generation software. In another example, the plurality of character glyphs are received as user input. Specifically, the user input includes designs and drawings of the plurality of character glyphs. In some examples, the plurality of character glyphs include the characters of more than one language. Further, in examples where more than one font weight style is generated, step 204 further involves generating a set of character glyphs for each font weight style.

At step 206, workflow 200 involves creating a scrambling font style for the font. Like the font weight style, the font scrambling font style can be created using a font generation software, which generates a source file for the scrambling font style. At step 208, workflow 200 involves generating a plurality of duplicate character glyphs for the scrambling font style. In an example, the plurality of duplicate character glyphs are duplicated from the plurality of character glyphs generated in step 204.

At step 210, workflow 200 involves swapping letterforms between the plurality of duplicate character glyphs. Swapping the letterforms causes the letterform of a character to be matched with the glyph code of another character. Thus, when a computing system calls a glyph code of a particular character, the letterform of another character is displayed. For example, the letterform "A" may be swapped with the letterform "C," such that the letterform "A" is associated with the glyph code of the character "C," and the letterform "C" is associated with the glyph code of the character "A." Thus, when a computing system calls the glyph code of the letter "A," the letterform "C" is displayed, and vice versa.

In some embodiments, swapping the letterforms accounts for case and positional context of letterforms. For languages that include uppercase and lowercase letters, uppercase letterforms are swapped with other uppercase letterforms, and lowercase letterforms are swapped with other lowercase letterforms. For languages that include positional-dependent letterforms, letterforms are swapped with other letterforms associated with the same position. For instance, a letterform that is associated with the beginning of a word for a first letter is swapped with a letterform that is associated with the beginning of a word for a second letter. Arabic is an example of a language that includes positional-dependent letterforms for letters. As such, for Arabic fonts, the letterform swap is performed for each positional case of each letter to allow correct linguistic morphology combinations despite incorrect or randomized semantic content and syntax after scrambling. In some embodiments, different letterforms of the same letter may be swapped with the letterforms of multiple letters. For example, an uppercase "C" may be swapped with an uppercase "U," while a lowercase "c" is swapped with a lowercase "o."

In some embodiments, swapping the letterforms accounts for kerning and side-bearings of letterforms. In order to do so, at least one of the kerning or side-bearing of the letterforms is determined prior to swapping. Once the kerning, side-bearing, or both of the letterforms is determined, letterforms with a threshold level of similarity of kerning, side-bearing, or both are swapped. Accounting for kerning, side-bearing, or both when swapping letterforms helps preserve the design appearance of the scrambled text.

In some embodiments, letterforms of letters are only swapped with letterforms of other letters (as opposed to the letterforms of numbers). The letterforms of numbers can be replaced with a single character, for example, the letterform of the number zero. In some examples, the letterforms of punctuation associated with numbers, for example, separator commas and decimal points, are swapped with the same letterform swapped for the number letterforms.

At step 212, the workflow 200 involves compiling the font. The compiled font includes one or more weight font styles (for example, regular, bold, and lightweight). Additionally, the compiled font includes a scrambling font style.

Returning to FIG. 1, the feature generator 102 stores the generated font in the feature database 104. In some examples, the font system 100 can provide the font to a computer system (for example, computer system 600 of FIG. 6). In turn, the computing system can provide a representation of the font to users via a user interface (for example, a GUI of a text editing software). The computing system can receive user input indicative of a selection of the font for a text. Once the font is selected for the text, the computing system can receive user input indicative of selection of the scrambling font style. In response, the computing system applies the scrambling font style to the text, which scrambles the text. In some embodiments, the feature generator 102 can periodically generate a new version of the scrambling font style in which the letterforms are swapped between different characters than the previous version. Doing so ensures the integrity of the security of the document.

Figure 3A:
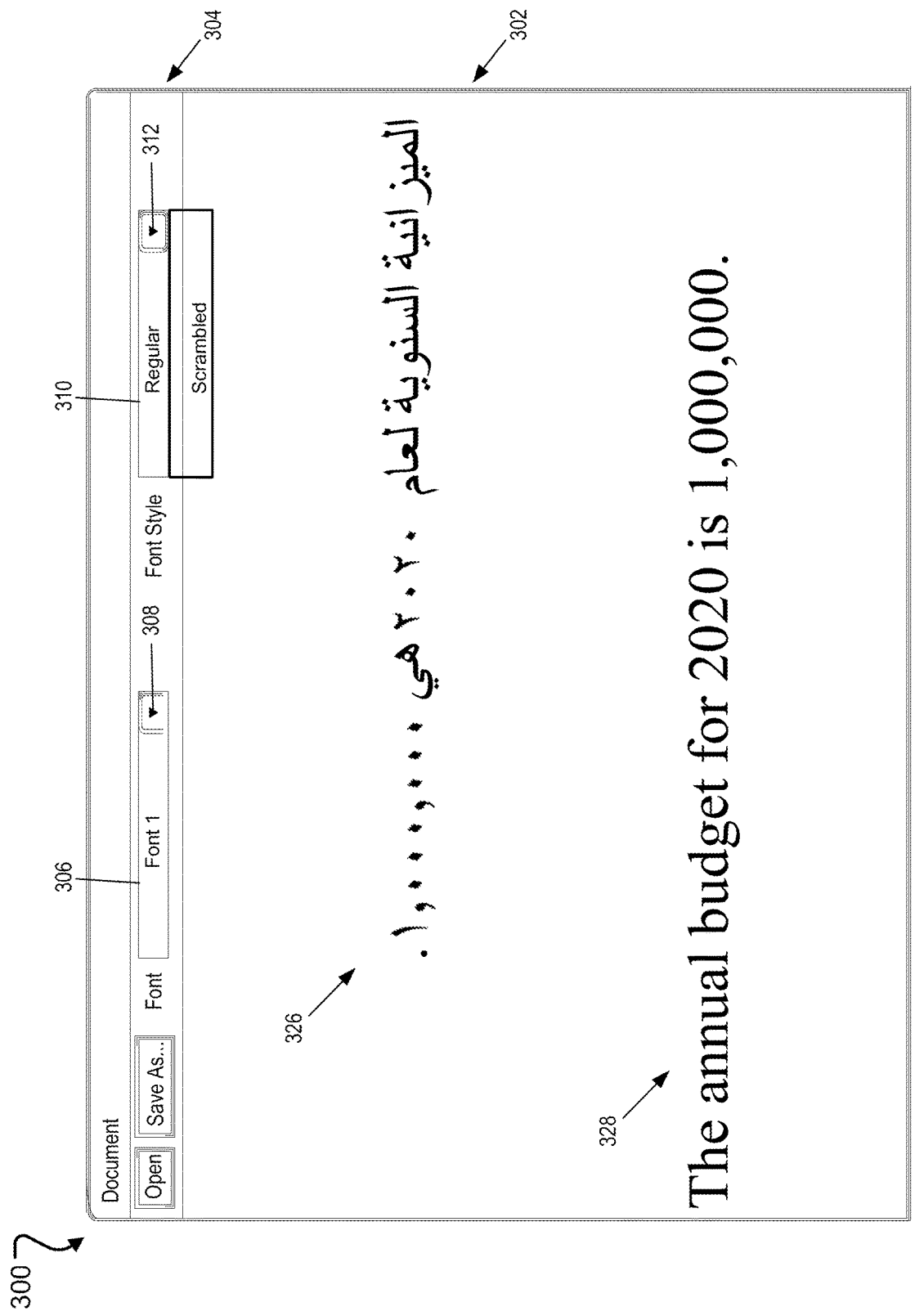
FIG. 3A and FIG. 3B illustrate an example graphical user interface (GUI) that provides a scrambling font to users of the interface, according to some implementations of the present disclosure.
Figure 3B:
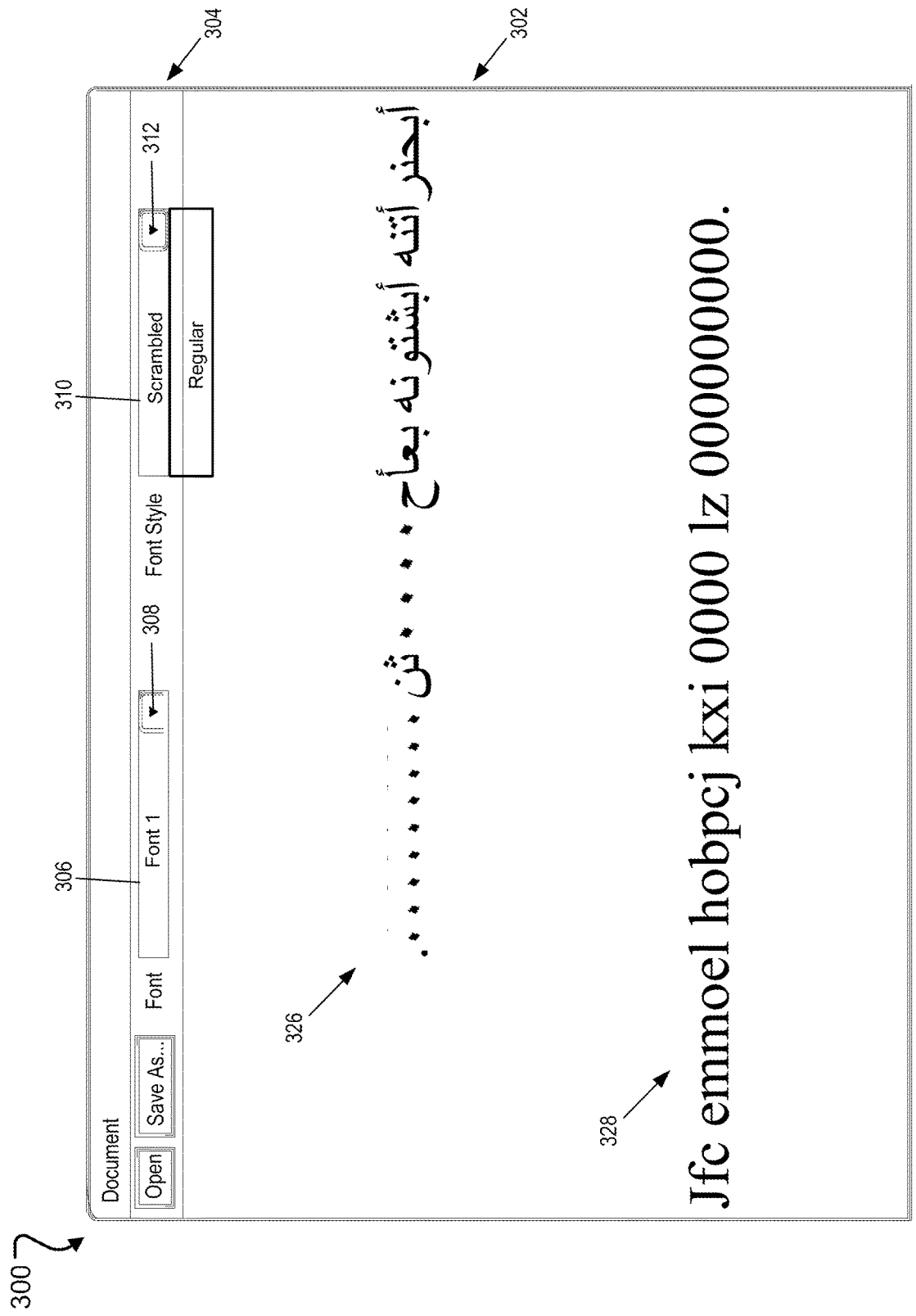

FIG. 3A and FIG. 3B each illustrate an example graphical user interface (GUI) 300 that provides a scrambling font to users of the interface, according to some implementations. The GUI 300 may be associated with any software application, such as a software text editor. As shown in FIG. 3A and FIG. 3B, the GUI 300 includes a primary window 302 that displays text and other software elements. Additionally, the GUI 300 includes a toolbar panel 304. The toolbar panel 304 includes a drop-down menu 306, which can be accessed by clicking arrow button 308. The drop-down menu 306 enables selection of a font for the text displayed in the primary window 302. Additionally, the tool panel 304 includes a drop-down menu 310, which can be accessed by clicking arrow button 312. The drop-down menu 310 enables selection of a font style of the font selected in the drop-down menu 306. As shown in FIG. 3A, "Font 1" is associated with two font styles: "Regular" and "Scrambled." Selection of the scrambled font style for a text scrambles that text. Selection of the regular font style for the scrambled text descrambles the text. To illustrate, consider the examples of FIG. 3A and FIG. 3B.

As shown in FIG. 3A, texts 326, 328 are displayed in the primary window 302. Text 326 is in Arabic and text 328 is in English. As shown in drop-down menu 310, the font style "Regular" is selected. As such, the texts 326, 328 are not scrambled. In FIG. 3B, however, the font style "Scrambled" is selected for the texts 326, 328. As such, the texts 326, 328 are scrambled. As shown in FIG. 3B, while characters of the texts 326, 328 are scrambled, the length, formatting, spacing, and placement of the text are maintained. Additionally, the letter cases, punctuation marks, and font appearance of the text are maintained. Thus, while selecting the "Scrambled" font scrambles the content of the document, the design of the document is preserved.

Returning to FIG. 1, in some embodiments, the feature generator 102 generates an OpenType stylistic set that enables toggling between scrambling/descrambling the content of a document. The feature generator 102 generates the stylistic set in addition to or as an alternative to the scrambling font style. In an example, the feature generator 102 generates a stylistic set that scrambles a text. Like the font generated by the feature generator 102, the stylistic set can provided on user interfaces to enable the scrambling/descrambling of content displayed on the user interfaces.

In some embodiments, in a first step of generating a stylistic set, the feature generator 102 generates a font (for example, as described in steps 202-204 of FIG. 2) or selects an existing font with which to associate the stylistic set. In a second step, the feature generator 102 adds a stylistic set (for example, SS01) to the font. The stylistic set includes a duplicate set of character glyphs of the font. In a third step, in the duplicate character set assigned to the stylistic set (for example, SS01), the feature generator 102 swaps the letterforms between glyphs such that the letterforms are mismatched with the glyph Unicode. Similar to generating the scrambling font style, the feature generator 102 performs the swapping with proper rearrangement planning and takes into account how operating systems call each character glyph. Further, the feature generator 102 accounts for case and positional context as well as kerning and side-bearing considerations. For Arabic fonts, the rearrangement is performed for each positional case of the letter to allow correct linguistic morphology combinations in spite of incorrect or randomized semantic content and syntax. In a fourth step, the feature generator 102 complies the stylistic set and stores it in the feature database 104.

Figure 6:
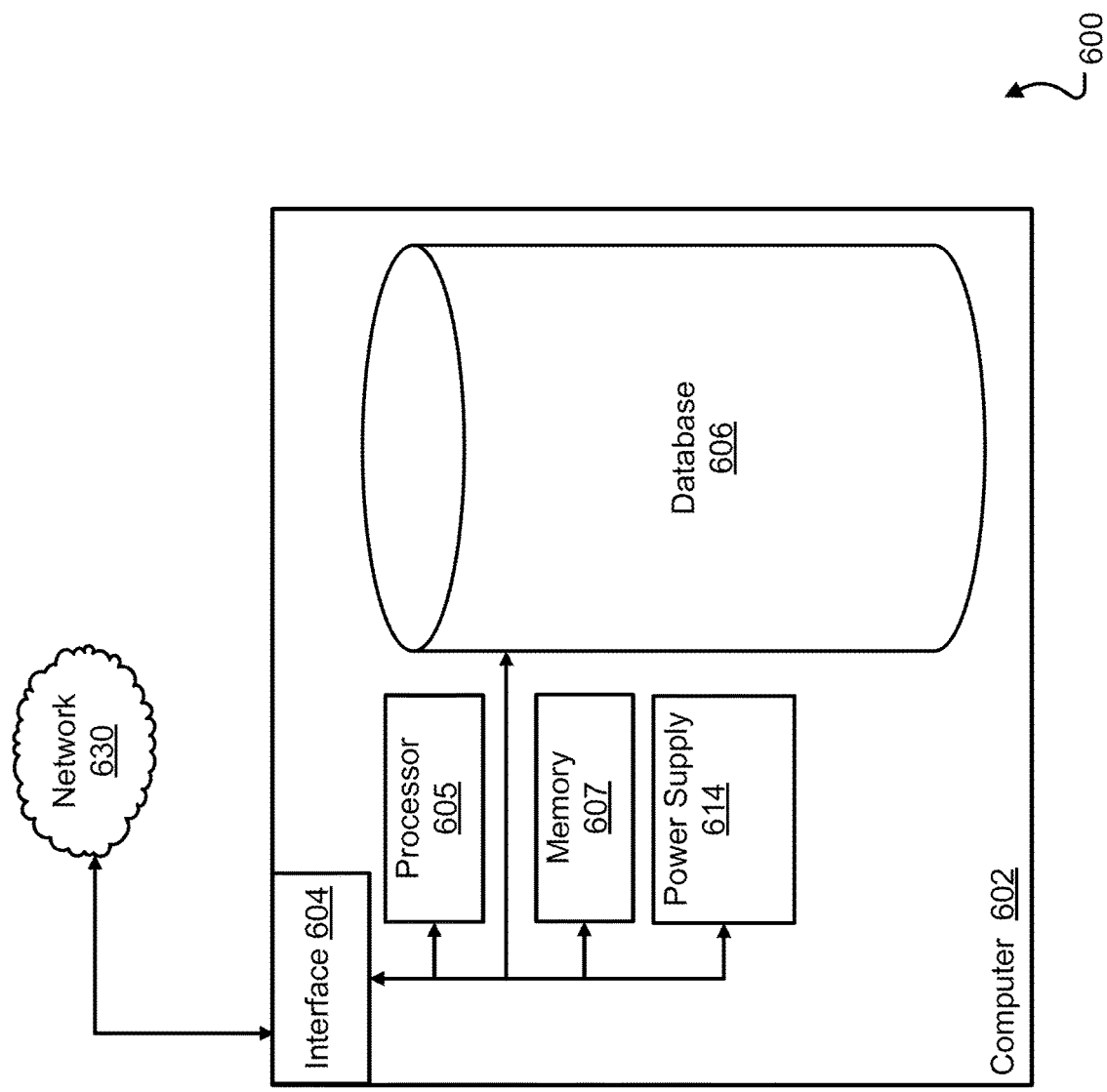
FIG. 6 illustrates a block diagram of an example computer system, according to some implementations of present disclosure.

In some embodiments, the font system 100 can provide the stylistic set stored in the font database 104 to a computer system (for example, computer system 600 of FIG. 6). The computing system can then provide an indication of the stylistic set to a user via a user interface. The user can provide a user input indicative of turning the stylistic set on/off in order to toggle between scrambling and descrambling a text.

Figure 4:
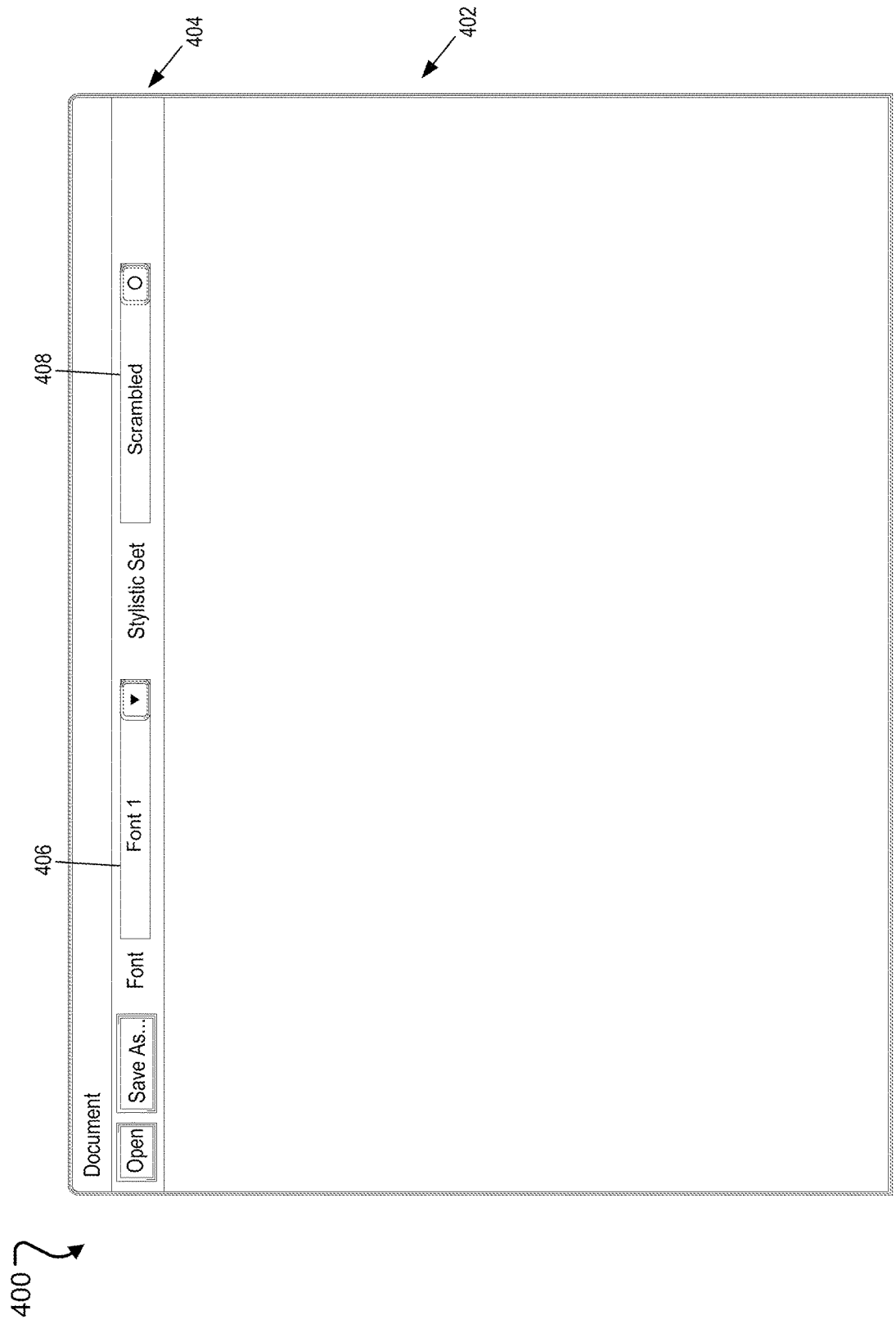
FIG. 4 illustrates an example graphical user interface (GUI) that provides a stylistic set to users of the interface, according to some implementations of the present disclosure.

FIG. 4 illustrates an example graphical user interface (GUI) 400 that provides a generated stylistic set to a user of the GUI, according to some implementations. The GUI 400 may be associated with any software application, such as a software text editor. As shown in FIG. 4, the GUI 400 includes a primary window 402 that displays text and other software elements. Additionally, the GUI 400 includes a toolbar panel 404. The toolbar panel 404 includes a menu 406 for selecting fonts for a text. The toolbar panel 404 also includes a graphical element 408 that enables selection/deselection of a stylistic set in connection with the selected font. In particular, the graphical element 408 can be used to turn the stylistic set on/off in order to toggle between scrambling and descrambling a text.

Figure 5A:
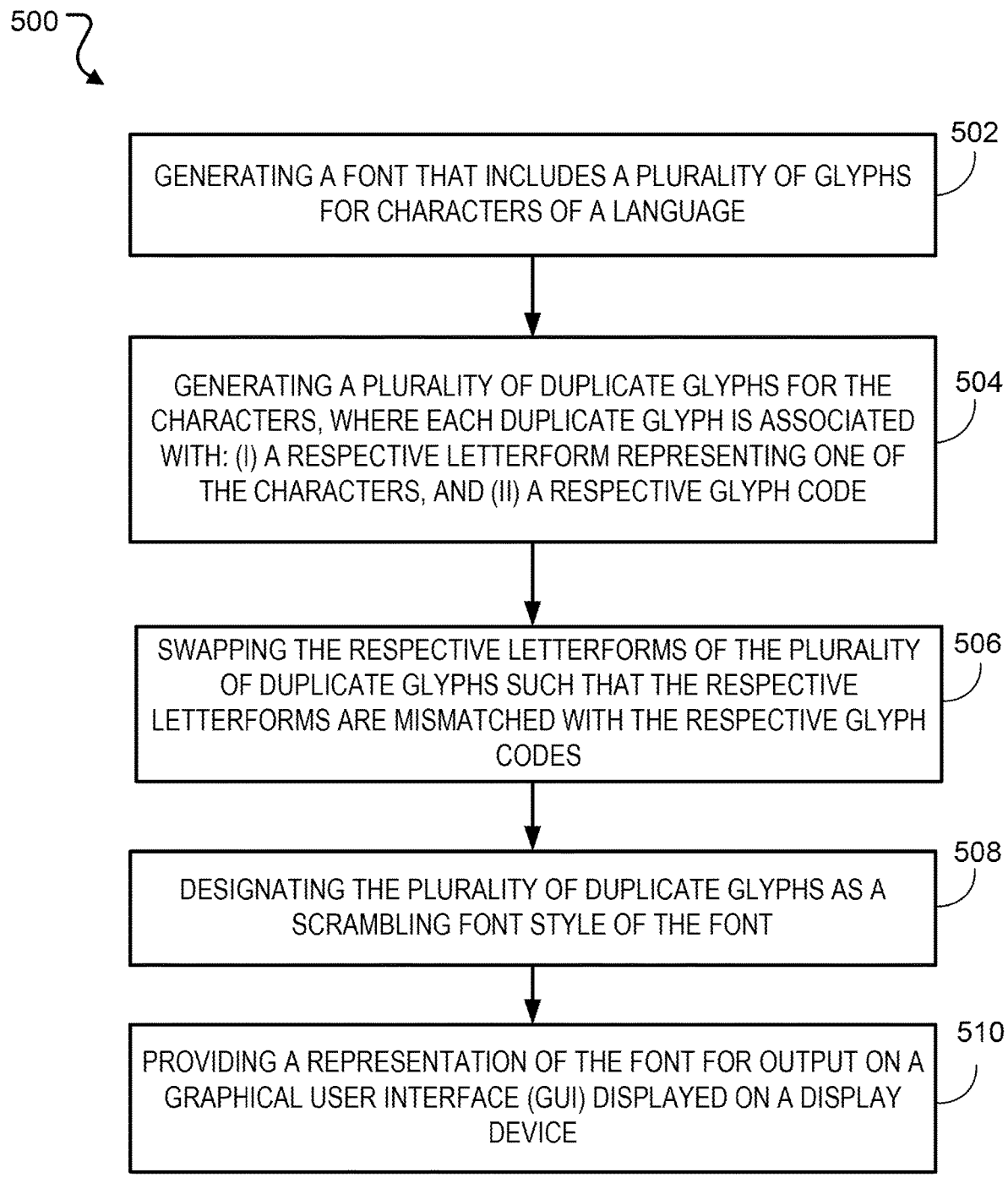
FIG. 5A illustrates a flowchart of an example method, according to some implementations of the present disclosure.

FIG. 5A is a flowchart of an example method 500, according to some implementations. The method 500 is for generating a scrambling font style, and for performing actions in connection with the generated scrambling font style. For clarity of presentation, the description that follows generally describes method 500 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 502, method 500 involves generating a font that includes a plurality of glyphs for characters of a language.

At step 504, method 500 involves generating a plurality of duplicate glyphs for the characters, where each duplicate glyph is associated with: (i) a respective letterform representing one of the characters, and (ii) a respective glyph code.

At step 506, method 500 involves swapping the respective letterforms of the plurality of duplicate glyphs such that the respective letterforms are mismatched with the respective glyph codes.

At step 508, method 500 involves designating the plurality of duplicate glyphs as a scrambling font style of the font.

At step 510, method 500 involves providing a representation of the font for output on a graphical user interface (GUI) displayed on a display device.

In some implementations, method 500 further involves generating at least one font weight style for the font; and providing the at least one font weight style for output on the GUI.

In some implementations, the GUI includes a font menu that includes a representation of the scrambling font style.

In some implementations, method 500 further involves receiving a user input indicating selection of the scrambling font style for a text displayed on the GUI.

In some implementations, method 500 further involves in response to receiving the user input, applying the scrambling font style to the text, where the text is scrambled after the scrambling font style is applied to the text.

In some implementations, a subset of the plurality of duplicate glyphs are associated with numerals, and where swapping the respective letterforms of the plurality of duplicate glyphs involves swapping the respective letterforms of the subset with a letterform of the numeral zero.

In some implementations, swapping the respective letterforms of the plurality of duplicate glyphs is based on at least one of: case of the respective letterforms, positional context of the respective letterforms, kerning of the respective letterforms, or side-bearings of the respective letterforms.

Figure 5B:
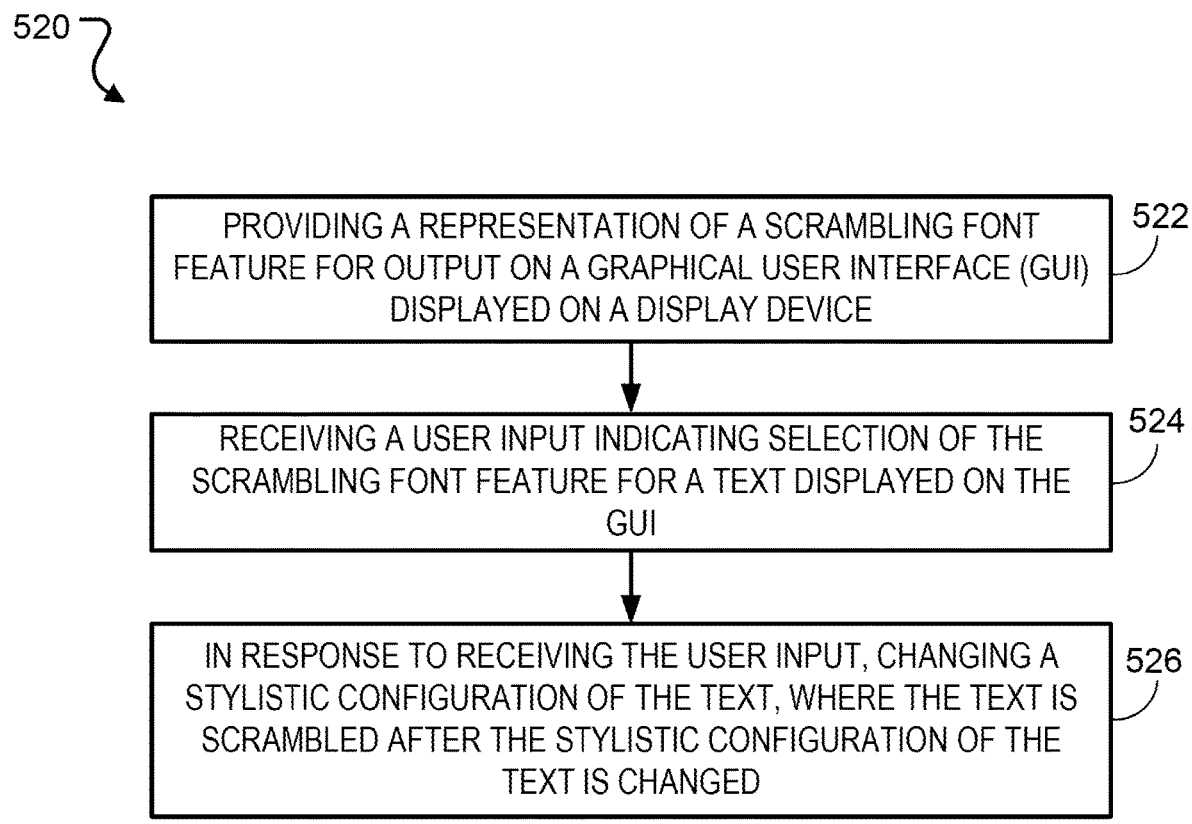
FIG. 5B illustrates a flowchart of another example method, according to some implementations of the present disclosure.

FIG. 5B is a flowchart of an example method 520, according to some implementations. For clarity of presentation, the description that follows generally describes method 520 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 522, method 520 involves providing a representation of a scrambling font feature for output on a graphical user interface (GUI) displayed on a display device.

At step 524, method 520 involves receiving a user input indicating selection of the scrambling font feature for a text displayed on the GUI.

At step 526, method 520 involves, in response to receiving the user input, changing a stylistic configuration of the text, where the text is scrambled after the stylistic configuration of the text is changed.

In some implementations, the scrambling font feature is a scrambling font style, and where the stylistic configuration of the text is a font style of the text.

In some implementations, the scrambling font feature is a scrambling stylistic set, and where the stylistic configuration of the text is a stylistic set of a font of the text.

In some implementations, the user input is a first user input, and where method 520 further involves: receiving a second user input indicating deselection of the scrambling font feature for the text displayed on the GUI; and in response to receiving the second user input, changing the stylistic configuration of the text, where the text is descrambled after the stylistic configuration of the text is changed.

In some implementations, the scrambling font feature includes a plurality of glyphs, where letterforms of the plurality of glyphs are mismatched with glyph codes of the plurality of glyphs.

In some implementations, the letterforms of the plurality of glyphs are swapped based on at least one of: case of the respective letterforms, positional context of the respective letterforms, kerning of the respective letterforms, or side-bearings of the respective letterforms.

FIG. 6 is a block diagram of an example computer system 600 that can be used to provide computational functionalities associated with described algorithms, methods, functions, processes, flows, and procedures described in the present disclosure, according to some implementations of the present disclosure. In some implementations, the font system 100 can be the computer system 600, include the computer system 600, or include part of the computer system 600. In some implementations, the font system 100 can communicate with the computer system 600.

The illustrated computer 602 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus. In some implementations, any or all of the components of the computer 602, including hardware or software components, can interface with each other or the interface 604 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 602 and other components (whether illustrated or not) that are communicably coupled to the computer 602. The functionality of the computer 602 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 602, in alternative implementations, the API or the service layer can be stand-alone components in relation to other components of the computer 602 and other components communicably coupled to the computer 602. Moreover, any or all parts of the API or the service layer can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 can also include a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application can be an algorithmic software engine providing functionality according to particular needs, desires, or particular implementations of the computer 602 and the described functionality. For example, an application can serve as one or more components, modules, or applications. Multiple applications can be implemented on the computer 602. Each application can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client," "user," and other appropriate terminology can be used interchangeably, as appropriate, without departing from the scope of the present disclosure.

Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
generating a font that includes a plurality of glyphs for characters of a language;
generating a plurality of duplicate glyphs for the characters, wherein each duplicate glyph is associated with: (i) a respective letterform representing one of the characters, and (ii) a respective glyph code;
swapping the respective letterforms of the plurality of duplicate glyphs such that the respective letterforms are mismatched with the respective glyph codes, wherein swapping the respective letterforms comprises:
selecting a first letterform to swap with a second letterform by identifying a threshold level of similarity between each of: (i) a case of the first letterform and the second letterform, (ii) a positional context of the first letterform and the second letterform, wherein the positional context is used to swap positional-dependent letterforms based on the position of the positional-dependent letterforms in a word, (iii) a kerning of the first letterform and the second letterform, and (iv) side-bearings of the first letterform and the second letterform;
designating the plurality of duplicate glyphs as a scrambling font style of the font wherein the scrambling font style preserves a design appearance of a scrambled text; and
providing a representation of the font for output on a graphical user interface (GUI) displayed on a display device.

2. The computer-implemented method of claim 1, further comprising:
generating at least one font weight style for the font; and
providing the at least one font weight style for output on the GUI.

3. The computer-implemented method of claim 1, wherein the GUI comprises:
a font menu that includes a representation of the scrambling font style.

4. The computer-implemented method of claim 1, the method further comprising:
receiving a user input indicating selection of the scrambling font style for a text displayed on the GUI.

5. The computer-implemented method of claim 4, the method further comprising:
in response to receiving the user input, applying the scrambling font style to the text, wherein the text is scrambled after the scrambling font style is applied to the text.

6. The computer-implemented method of claim 1, wherein a subset of the plurality of duplicate glyphs are associated with numerals, and wherein swapping the respective letterforms of the plurality of duplicate glyphs comprises:
swapping the respective letterforms of the subset with a letterform of the numeral zero.

7. A computer-implemented method comprising:
providing a representation of a scrambling font feature for output on a graphical user interface (GUI) displayed on a display device, wherein the scrambling font feature includes a plurality of glyphs with letterforms that are mismatched with glyph codes of the plurality of glyphs, and wherein the mismatching is the result of swapping the letterforms of the plurality of glyphs, wherein swapping the letterforms of the plurality of glyphs comprises:
selecting a first letterform to swap with a second letterform by identifying a threshold level of similarity between each of: (i) a case of the first letterform and the second letterform, (ii) a positional context of the first letterform and the second letterform, wherein the positional context is used to swap positional-dependent letterforms based on the position of the positional-dependent letterforms in a word, (iii) a kerning of the first letterform and the second letterform, and (iv) side-bearings of the first letterform and the second letterform;

receiving a user input indicating selection of the scrambling font feature for a text displayed on the GUI, wherein the scrambling font style preserves a design appearance of the text; and in response to receiving the user input, changing a stylistic configuration of the text, wherein the text is scrambled after the stylistic configuration of the text is changed.

8. The computer-implemented method of claim 7, wherein the scrambling font feature is a scrambling font style, and wherein the stylistic configuration of the text is a font style of the text.

9. The computer-implemented method of claim 7, wherein the scrambling font feature is a scrambling stylistic set, and wherein the stylistic configuration of the text is a stylistic set of a font of the text.

10. The computer-implemented method of claim 7, wherein the user input is a first user input, and wherein the computer-implemented method further comprises:

receiving a second user input indicating deselection of the scrambling font feature for the text displayed on the GUI; and in response to receiving the second user input, changing the stylistic configuration of the text, wherein the text is descrambled after the stylistic configuration of the text is changed.

11. A system, comprising:
one or more processors; and
a non-transitory computer-readable storage medium coupled to the one or more processors and storing programming instructions for execution by the one or more processors, the programming instructions instructing the one or more processors to perform operations comprising:

generating a font that includes a plurality of glyphs for characters of a language;

generating a plurality of duplicate glyphs for the characters, wherein each duplicate glyph is associated with: (i) a respective letterform representing one of the characters, and (ii) a respective glyph code;

swapping the respective letterforms of the plurality of duplicate glyphs such that the respective letterforms are mismatched with the respective glyph codes, wherein swapping the respective letterforms comprises:

selecting a first letterform to swap with a second letterform by identifying a threshold level of similarity between each of: (i) a case of the first letterform and the second letterform, (ii) a positional context of the first letterform and the second letterform, wherein the positional context is used to swap positional-dependent letterforms based on the position of the positional-dependent letterforms in a word, (iii) a kerning of the first letterform and the second letterform, and (iv) side-bearings of the first letterform and the second letterform;

designating the plurality of duplicate glyphs as a scrambling font style of the font, wherein the scrambling font style preserves a design appearance of a scrambled text; and providing a representation of the font for output on a graphical user interface (GUI) displayed on a display device.

12. The system of claim 11, the operations further comprising:

generating at least one font weight style for the font; and
providing the at least one font weight style for output on the GUI.

13. The system of claim 11, wherein the GUI comprises:
a font menu that includes a representation of the scrambling font style.

14. The system of claim 11, the operations further comprising:

receiving a user input indicating selection of the scrambling font style for a text displayed on the GUI.

15. The system of claim 14, the operations further comprising:

in response to receiving the user input, applying the scrambling font style to the text, wherein the text is scrambled after the scrambling font style is applied to the text.

16. The system of claim 11, wherein a subset of the plurality of duplicate glyphs are associated with numerals, and wherein swapping the respective letterforms of the plurality of duplicate glyphs comprises:

swapping the respective letterforms of the subset with a letterform of the numeral zero.

* * * * *